UNITED STATES PATENT OFFICE.

ERNEST CARL LINDEMANN, OF BOULDER, COLORADO.

COMPOSITION OF MATTER FOR USE AS A FERTILIZER.

1,058,765.　　　　Specification of Letters Patent.　　Patented Apr. 15, 1913.

No Drawing.　　Application filed November 5, 1912. Serial No. 729,647.

*To all whom it may concern:*

Be it known that I, ERNEST CARL LINDEMANN, a citizen of the United States, residing at Boulder, county of Boulder, and State of Colorado, have invented certain new and useful Improvements in Composition of Matter for Use as a Fertilizer; and I do declare the following to be a full, clear, and exact description of the invention, such as will enable others skilled in the art to which it appertains to make and use the same.

My invention relates to a composition of matter for use as a fertilizer, the said fertilizer being composed of titaniferous iron ore and raw calcium carbonate. These two substances are separately pulverized and then mingled in suitable proportions. Both ingredients should be reduced to a fineness of not less than 100 to 150 mesh, or to such a fineness that they will pass through a screen having from 100 to 150 meshes to the square inch. A pulp mill and mixer may be utilized for combining the said ingredients. The mixing operation should be sufficient to render the mass homogeneous throughout.

The proportions of the ingredients employed in forming the fertilizer may vary considerably, depending upon the soil upon which the material is to be used. For instance, from 80 to 95 per cent. of the raw calcium carbonate may be employed, while from 5 to 20 per cent. of the titaniferous iron ore may be used. It will, therefore, be understood that I do not wish to limit the invention to precise proportions, since they may be varied within reasonable limits, as above indicated.

In using this fertilizer the quantity required per acre will depend upon the soil. An alluvial soil will require approximately 650 pounds per acre, while a sandy or auriferous soil will not need more than 400 to 500 pounds.

In applying the fertilizer it is preferred to introduce it to the ground by the employment of a drill having hollow teeth which enter the earth to the required depth, depending upon the character of the soil. If the surface soil is deep, the fertilizer should be introduced to a greater depth than where the soil is comparatively thin. Where the subsoil is deep, or at a considerable distance below the surface, the fertilizer should be drilled in deeper and a larger quantity should be used than where the subsoil is at a less depth.

Attention is also called to the fact that my composition is not only an exceedingly valuable fertilizer, but it also drives away or destroys cut-worms and other vermin accustomed to injure crops by working beneath the surface of the ground. It may be used as well for fertilizing upon the surface of the ground where drilling is inappropriate or impossible; for example, in such crops as alfalfa.

Having thus described my invention, what I claim is:

1. A fertilizer composed of titaniferous iron ore and raw calcium carbonate.

2. A fertilizer composed of titaniferous iron ore and raw calcium carbonate combined in the proportions by weight of 5 to 20% of titaniferous iron ore and 80 to 95% of raw calcium carbonate.

In testimony whereof I affix my signature in presence of two witnesses.

ERNEST CARL LINDEMANN.

Witnesses:
　EVA L. HALL,
　MAY CLEMENTS.